US005227216A

United States Patent [19]
Pettit

[11] Patent Number: 5,227,216
[45] Date of Patent: Jul. 13, 1993

[54] FIBER/METAL LAMINATE

[75] Inventor: Richard G. Pettit, La Habra, Calif.

[73] Assignee: McDonnell Douglas Corporation, Long Beach, Calif.

[21] Appl. No.: 675,350

[22] Filed: Mar. 25, 1991

[51] Int. Cl.$^5$ .................. B32B 15/08; B32B 5/12; B32B 15/04
[52] U.S. Cl. ................... 428/113; 428/114; 428/246; 428/252; 428/284; 428/285; 428/288; 428/294; 428/298; 428/302; 428/416; 428/418; 428/457; 428/902
[58] Field of Search ............... 428/213, 215, 246, 252, 428/294, 416, 418, 425.8, 474.4, 902, 113, 144, 284, 288, 298, 302, 457; 156/229, 285

[56] References Cited

U.S. PATENT DOCUMENTS

| | | | |
|---|---|---|---|
| 4,489,123 | 12/1984 | Schijve et al. | 428/213 |
| 4,500,589 | 2/1985 | Schijve et al. | 428/213 |
| 4,935,291 | 6/1990 | Gunnink | 428/213 |
| 4,992,323 | 2/1991 | Vogelesang et al. | 428/215 |

Primary Examiner—George F. Lesmes
Assistant Examiner—James D. Withers
Attorney, Agent, or Firm—Donald E. Stout; John P. Scholl

[57] ABSTRACT

A fiber/metal laminate composite material is comprised of a plurality of metallic layers, reinforced with a plurality of fiber layers. The metallic layers are preferably aluminum, while the fibers in the fiber layers are preferably comprised of an aramid. The fibers are bi-directionally oriented. To provide the laminate with superior fiber failure resistance characteristics, the laminate is post-stretched along a post-stretch axis which bisects the two fiber axes.

9 Claims, 1 Drawing Sheet

1

FIBER/METAL LAMINATE

BACKGROUND OF THE INVENTION

1. Technical Field

This invention relates to fiber/metal laminates, and more particularly to an aramid/aluminum laminate having greatly improved fatigue characteristics and being particularly suited to use as an aircraft fuselage material.

2. Background Information

Two major concerns in the manufacture of aircraft structural components, particularly the fuselage, are fatigue strength and weight. Sheet aluminum is the state-of-the-art fuselage sidewall material because of its light weight and relatively easy workability. However, one of the greatest aging aircraft problems facing the industry today is the weakening of the pressure cabin due to multiple-site fatigue damage, which is caused by repeated pressurization and de-pressurization of the cabin during takeoffs and landings. Aluminum is sensitive to fatigue stress, and therefore a number of alternatives have been considered in an attempt to improve fatigue life while retaining aluminum's lightweight characteristics and workability.

The most successful and cost efficient alternatives have been composite materials, particularly fiber/metal laminates. The earliest available fiber/metal laminates were made of aramid and aluminum (such as the ARALL ® laminates manufactured by a division of the Aluminum Corporation of America (ALCOA), located in Parnassus, Pa. These laminates were developed for high fatigue crack growth resistance. However, tests have shown that unstretched aramid/aluminum laminates can experience an adverse fiber failure phenomenon, subject to certain loading conditions.

A solution to the problem of adverse fiber failure can be obtained by "post-stretching" the aramid/aluminum laminate. By this procedure, the laminate is placed in tension along a post-stretch axis which lies parallel to the fiber orientation, and is thereby stretched. Force is applied until the metallic layers yield plastically and the entire laminate is permanently elongated a predetermined amount. Since the fibers remain elastic throughout the process, they retain a certain degree of residual tensile stress after the stretching operation is complete. The effect is essentially to pre-stress the fibers. The tensile stress in the fibers induces a reactive compressive stress in the metallic layers. The result is a laminate with increased tensile yield strength, improved fatigue performance (prestressed fibers hold fatigue cracks in the metal layers more firmly shut, impeding crack growth), and improved resistance to fiber failure (due to the residual tension, the fibers are less vulnerable to repeated microbuckling).

This post-stretching solution has been applied successfully to unidirectional laminates, i.e. laminates having fibers oriented in only one direction. The post-stretch axis is parallel to the fiber orientation, as discussed above, and the above-mentioned properties are generally realized. However, there are many applications, such as an aircraft fuselage sidewall, which require strength properties provided only by laminates which are reinforced with bi-directionally oriented fibers. Such bi-directionally reinforced laminates, typically having a fiber orientation of 0° and 90°, usually are unstretched, because stretching along one fiber direction (for example, the 0° direction) will cause the metal to contract in the transverse direction, thus inducing undesirable compressive stresses in the transverse (90°) fiber plies. No suitable process has been developed to date for bi-directionally post-stretching fiber/metal laminates. Unstretched bi-directionally reinforced aramid/aluminum laminates have inadequate fiber failure resistance, and therefore these laminates have not heretofore been suitable for use in such fatigue-critical applications.

Another potential solution to the fatigue problem discussed above is to use fiberglass reinforced aluminum laminates, which, when reinforced by bi-directionally oriented glass fibers have shown good fiber failure resistance even without post-stretch. However, the glass fibers are much heavier than aramid fibers and have a lower modulus, and thus are not as suited to weight-critical aircraft applications.

What is needed, therefore, is a fiber-failure resistant aramid reinforced aluminum laminate having bi-directionally oriented fibers.

SUMMARY OF THE INVENTION

This invention solves the problem outlined above by providing a fiber/metal laminate reinforced with bi-directionally oriented fibers which are fiber-failure resistant, making the laminate durable in fatigue. The laminate is comprised of at least one metallic layer, preferably aluminum, and at least one fiber layer wherein the laminate has a first predetermined fiber orientation parallel to a first fiber axis, and a second predetermined fiber orientation parallel to a second fiber axis. The fibers are preferably comprised of an aramid. The first predetermined fiber orientation is different than the second predetermined fiber orientation. A post-stretch axis lies along the laminate and creates a fiber angle between itself and each of the first and second fiber axes. The laminate is placed in tension and thereby post-stretched along this post-stretch axis so that the fibers parallel to both the first and the second fiber axes have an induced residual tensile stress; i.e. the fibers therein remain in residual tension even after the stretching force has been relaxes. This residual tension is important in that it gives the fibers a much greater resistance to fiber failure. Preferably, the post-stretch axis substantially bisects the fibers axes so that the fiber angles between the post-stretch axis and each fiber axis are substantially the same. In a preferred embodiment, each fiber angle is within the range of approximately 20° to 60°, and preferably about 45°.

When the laminate has been post-stretched, the permanent elongation along the post-stretch axis is in the range of approximately 0.5–10%, and for aircraft fuselage sidewall applications, the permanent elongation is most ideally in the 2–4% range.

In another aspect of the invention, a method of manufacturing a fiber/metal composite laminate is disclosed. The method involves adhering at least one metallic layer to first and second fiber layers, with the first fiber layer having a first predetermined fiber orientation parallel to a first fiber axis and the second fiber layer having a second predetermined fiber orientation parallel to a second fiber axis. The second predetermined fiber orientation is different than the first predetermined fiber orientation. The laminate is stretched along a post-stretch axis which lies along the laminate and substantially bisects the fiber axes. When the stretching step is completed, the fibers in both the first and second fibers layers have an induced residual tensile stress therein.

The above mentioned and other objects and features of this invention and the manner of attaining them will become apparent, and the invention itself will be best understood, by reference to the following description taken in conjunction with the accompanying illustrative drawings.

DETAILED DESCRIPTION OF THE INVENTION

Figure 1:
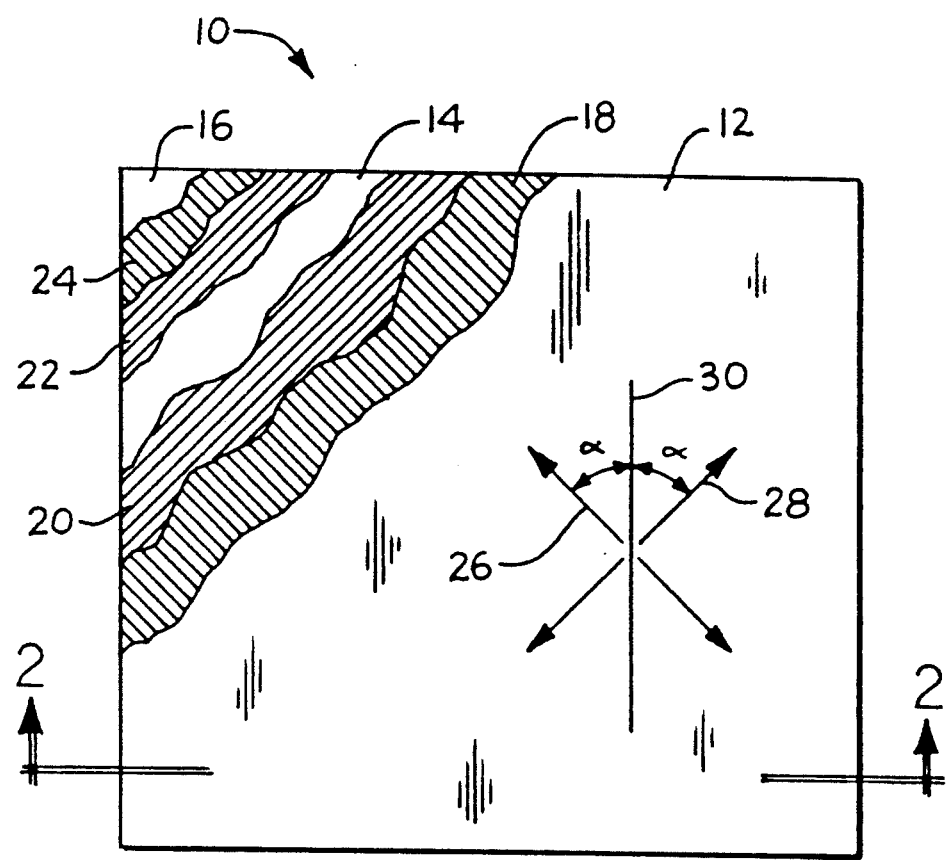
FIG. 1 is a partially sectioned top view of an aramid-/aluminum fiber laminate made in accordance with the teachings of this invention, showing the fiber orientation in some of the fiber layers, as well as the metallic layers.
Figure 2:
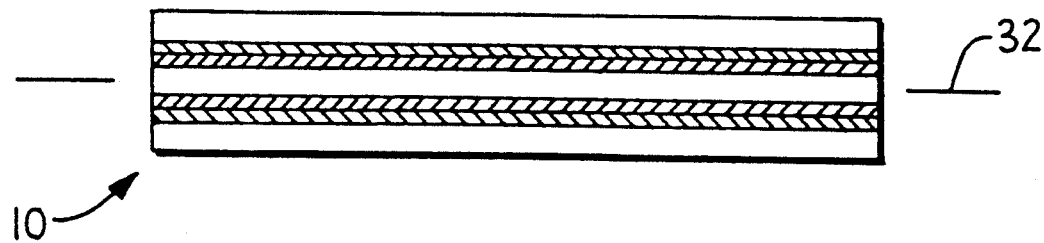
FIG. 2 is a cross-sectional view taken along lines 2—2 of FIG. 1, showing the arrangement of the laminate plies about its midplane.

Referring now to FIGS. 1 and 2, a fiber/metal laminate 10 is shown according to the invention. The laminate is comprised of metal layers 12, 14, and 16, and fiber layers 18, 20, 22, and 24. Of course, a greater or lesser number of metallic and fiber layers could be employed depending upon strength design characteristics for the particular application, the illustrated arrangement merely being representative. In the preferred embodiment, the metallic layers 12, 14, and 16 are aluminum, while the fiber layers 18, 20, 22, and 24 are comprised of an aramid. The fiber layers may be separate plies of unidirectional tape or a suitable woven fabric or the equivalent. The metal layers would typically be 10 to 20 mils thick and would make up about 40% to 70% of the total laminate volume. As shown in FIG. 1, the resultant laminate is a family of fiber reinforced metallic laminates with symmetric diagonal fiber reinforcement.

The fibers in a first fiber layer 18 are oriented parallel to a first fiber axis 26, while those in a second fiber layer 20 are oriented parallel to a second fiber axis 28. The fibers in the remaining fiber layers are oriented in alternating fashion parallel to either the first fiber axis 26 or the second fiber axis 28. In the preferred embodiment, a post-stretch axis 30 bisects the two fiber axes 26 and 28. A fiber angle is formed between each of the fiber axes 26 and 28 and the post-stretch axis 30, and should be the same between both fiber axes and the post-stretch axis, since the post-stretch axis bisects them. Laminate properties may be tailored by manipulating the fiber angle $\alpha$. Depending on the application, the fiber angle may range from 20° to 60°. However, in the preferred embodiment, the fiber axes 26 and 28 are perpendicular to one another. The fiber angles $\alpha$ are thus ±45° between the post-stretch axis 30 and the fiber axes 26, 28. Inplane fiber orientation is symmetric and balanced about the post-stretch axis 30, which should usually be arranged to coincide with the metal rolling direction. Viewing FIG. 2, in particular, the laminate midplane 32 is shown. Preferably, the laminate is symmetric across the midplane as well, though laminates without midplane symmetry also are useful in certain applications.

In manufacture, a laminate is laid up and adhesively bonded, and is subsequently post-stretched to a specified set strain along the post-stretch axis 30. The post-stretch operation induces residual tensile stress in the fiber layers 18, 20, 22, and 24 and a bi-directional compressive stress in the metallic layers 12, 14, and 16. These residual stresses enhance the resistance of the material to fatigue crack growth and fiber failure. The required post-stretch set strain (permanent elongation of the laminate in the post-stretch direction) will vary with laminate constituents, geometry and performance requirements, within a range of approximately 0.5% to 10%. For ±45° laminates with aramid fiber and aluminum alloy sheets (approximately 50% volume fraction aluminum) a set strain suitable for aerospace structural applications may ideally be between 2% and 4%.

The key concept which provides the above-described advantages over the prior art fiber/metal laminates is that the orientation of the post-stretch axis 30 is not parallel to either of the fiber axes 26 or 28, and preferably bisects the two axes. Thus, the fiber angle $\alpha$ is never 0°. As the laminate is stretched along this post-stretch axis, it contracts transversely due to the lumped Poisson's ratio. As long as the fiber angle $\alpha$ is sufficiently small (less than, for example, about 60°), the strain resultant along the fibers is positive, thus causing them to elongate under load. Stretching continues well into the plastic range, following which the applied load is relaxed and the laminate contracts until the residual stresses in the fibers and in the metal layers reach equilibrium. Since the resultant fiber strains in the stretching process were constrained to be positive by limiting the fiber angle, the residual fiber stresses are likewise positive, or tensile. Since the fibers run in two directions, the combined stress resultant of the fibers is thus positive (tensile) in all in-plane directions, and must therefore be reacted by residual compression in all in-plane directions in the metal layers. This situation is most desirable for the fatigue durability of the laminate. A significant feature is that the laminate strain-to-failure ratio in the stretching direction is no longer directly limited to the fiber strain-to-failure ratio, thus improving the formability of the material and providing a unique set of bi-directional material properties.

This invention, while limited to diagonally reinforced geometries, provides favorable tensile stresses in the fibers bi-directionally, even though the laminate is post-stretched unidirectionally-a simple, economic process. The diagonally reinforced concept also allows stretch forming to large strains (larger even than possible in present unidirectional laminates) without inducing undesirable compressive stresses in any of the fiber layers. The laminate may replace sheet metal in various structural applications requiring low weight, high shear strength, or high fatigue resistance. It may be fabricated using practices similar to those for sheet metal or conventional fiber/metal laminates, including bending, stretch-forming, milling, drilling, and countersinking. Potential uses would include, for example, aircraft fuselage skins, doublers, pressure bulkhead webs, shear webs, and frames.

Although an exemplary embodiment of the invention has been shown and described, many changes, modifications, and substitutions may be made by one having ordinary skill in the art without departing from the spirit and scope of the invention.

What is claimed is:

1. A fiber/metal composite laminate comprising:
   at least one metallic layer;
   at least one fiber layer;
   a first fiber orientation parallel to a first fiber axis;
   a second fiber orientation parallel to a second fiber axis, the second fiber orientation being different than the first fiber orientation; and
   a post-stretch axis lying along said laminate whereby a fiber angle is defined between said post-stretch axis and each said fiber axis said fiber angle between said post-stretch axis and each said fiber axis being within the range of approximately 20°–60°;

wherein said laminate is post-stretched along said post-stretch axis such that said fibers parallel to both said first and said second fiber axes have an induced residual tensile stress wherein said laminate is post-stretched along said post-stretch axis such that said laminate is permanently elongated in the range of approximately 0.5 to 10%.

2. The fiber/metal composite laminate as recited in claim 1, wherein said post-stretch axis substantially bisects the fiber axes such that the fiber angles between said post-stretch axis and each said fiber axis are substantially the same.

3. The fiber/metal composite laminate as recited in claim 2, wherein each said fiber angle is approximately 45°.

4. The fiber/metal composite laminate as recited in claim 1, wherein said at least one metallic layer comprises aluminum and the fibers in said at least one fiber layer comprise an aramid.

5. The fiber/metal composite laminate as recited in claim 1, wherein said post-stretch axis coincides with the metal rolling direction of said at least one metallic layer.

6. The fiber/metal composite laminate as recited in claim 1, wherein the laminate along said post-stretch axis is permanently elongated in the range of approximately 2–4%.

7. A fiber/metal composite laminate comprising:

at least one metallic layer;

a first fiber layer having a first fiber orientation parallel to a first fiber axis;

a second fiber layer having a second fiber orientation parallel to a second fiber axis, the second fiber orientation being different than the first fiber orientation; and a post-stretch axis lying along said laminate and bisecting the fiber axes, whereby fiber angles of approximately equal size are defined between said post-stretch axis and each said fiber axis said fiber angles each being between greater than 0° and about 60°;

wherein said laminate is post-stretched along said post-stretch axis such that it is permanently elongated in the range of approximately 0.5–10%.

8. The fiber/metal composite laminate as recited in claim 7 wherein said metallic layer comprises aluminum and the fibers in each said fiber layer comprise an aramid.

9. The fiber/metal composite laminate as recited in claim 7, wherein each said fiber angle is approximately 45°.

* * * * *